United States Patent
Nakashima et al.

(10) Patent No.: US 7,551,213 B2
(45) Date of Patent: Jun. 23, 2009

(54) METHOD FOR DETECTING VERTICAL TRANSFER DEFECTS IN IMAGE SENSORS

(75) Inventors: Toshiyuki Nakashima, Osaka (JP); Toshiya Kogishi, Kyoto (JP); Kenji Arakawa, Osaka (JP); Toshinobu Hatano, Kyoto (JP); Jun Kajiwara, Kyoto (JP)

(73) Assignee: Panasonic Corporation, Osaka (JP)

( * ) Notice: Subject to any disclaimer, the term of this patent is extended or adjusted under 35 U.S.C. 154(b) by 707 days.

(21) Appl. No.: 11/127,250

(22) Filed: May 12, 2005

(65) Prior Publication Data

US 2005/0253939 A1  Nov. 17, 2005

(30) Foreign Application Priority Data

May 13, 2004 (JP) ............. P2004-143478
Apr. 28, 2005 (JP) ............. P2005-132660

(51) Int. Cl.
*H04N 9/64* (2006.01)
*H04N 3/14* (2006.01)
*H04N 5/335* (2006.01)

(52) U.S. Cl. ............ 348/246; 348/250; 348/311
(58) Field of Classification Search ............ 348/243, 348/246

See application file for complete search history.

(56) References Cited

U.S. PATENT DOCUMENTS

| 6,614,472 B1 * | 9/2003 | Yamashita ............ 348/243 |
| 7,317,480 B1 * | 1/2008 | Cho et al. ............ 348/243 |
| 2004/0165103 A1 * | 8/2004 | Hashimoto et al. ........ 348/372 |

FOREIGN PATENT DOCUMENTS

JP  2002-84463 A  3/2002

* cited by examiner

*Primary Examiner*—Lin Ye
*Assistant Examiner*—Leslie Virany
(74) *Attorney, Agent, or Firm*—McDermott Will & Emery LLP

(57) ABSTRACT

A charge transfer implemented by a transfer section for transferring charges stored in image sensor elements along one direction on a surface where the image sensor elements are disposed is halted for a predetermined length of time. The charges are transferred from the transfer section without reading the charges from the image sensor elements after the charge transfer is halted for the predetermined length of time. A position where a defect is generated in an image pickup sensor is identified based on signal levels of the transferred charges. A defective signal level of the image pickup sensor generated on a line including the defect-generating position and in parallel with the one direction is corrected. As a result of the foregoing process, a display failure is precisely corrected.

22 Claims, 5 Drawing Sheets

F I G. 5
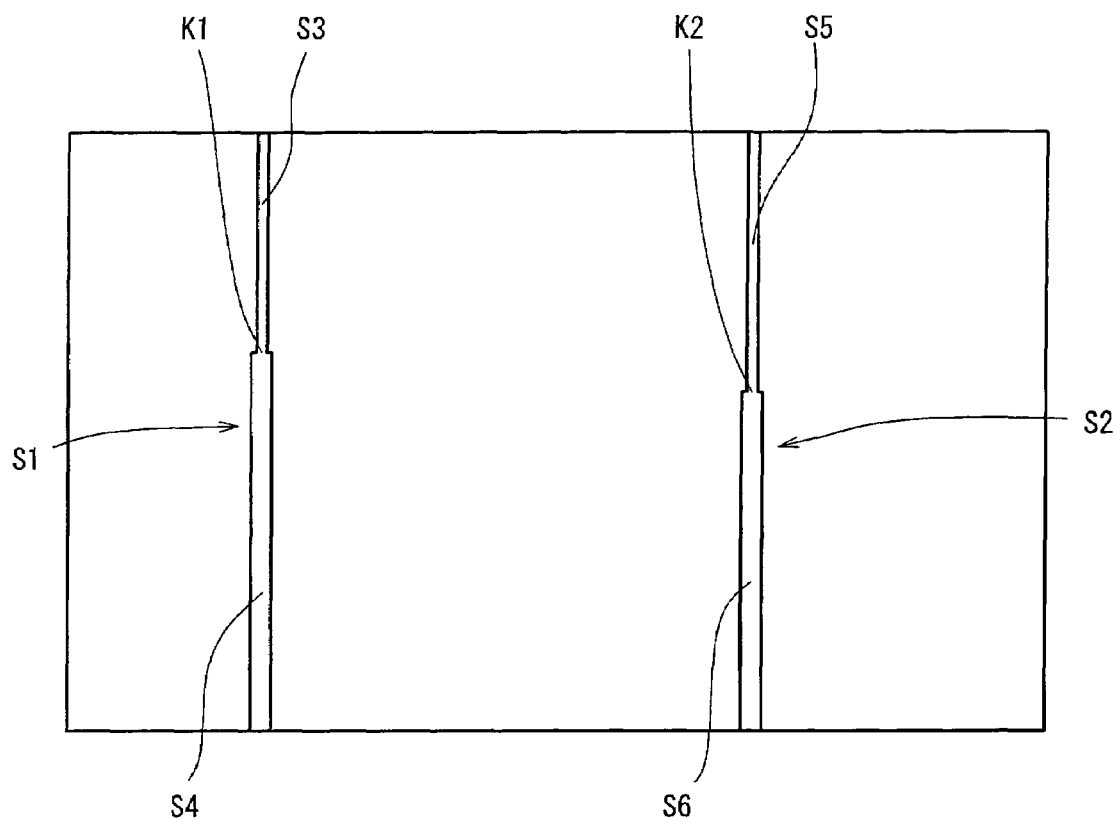
F I G. 6

METHOD FOR DETECTING VERTICAL TRANSFER DEFECTS IN IMAGE SENSORS

FIELD OF THE INVENTION

The present invention relates to an image processing method for correcting a poor display of an image pickup sensor.

BACKGROUND OF THE INVENTION

A method of manufacturing an image pickup sensor has been increasingly refined in response to the advancement of an image sensor element in a digital still camera. The image pickup sensor manufactured in the fine process is more influenced by a dark current of a vertical transfer section. When there is a large influence from the dark current of the vertical transfer section, an image quality is deteriorated due to a linear display failure (flaw on the display) vertically generated at the time of the vertical transfer. A conventional technology relating to the correction of the defective display (correction of the flaw) is disclosed in No. 2002-84463 of the Publication of the Unexamined Japanese Patent Applications, which, however, is insufficient to fully solve the problem.

SUMMARY OF THE INVENTION

Therefore, a main object of the present invention is to precisely correct a display failure which is linearly generated.

In order to realize the foregoing object, an image processing method, according to the present invention, for correcting a defective signal level of an image pickup sensor comprising image sensor elements two-dimensionally disposed and a transfer section for transferring charges stored in the image sensor elements along one direction on a surface where the image sensor elements are disposed comprises:

a first step of halting the transfer of the charges by the transfer section for a predetermined length of time;

a second step of transferring the charges from the transfer section after the transfer of the charges is halted for the predetermined length of time without reading the charges from the image sensor elements;

a third step of identifying a position where a defect is generated in the image pickup sensor based on signal levels of the charges transferred in the second step; and a fourth step of correcting the defective signal level of the image pickup sensor generated on a line including the defect-generating position identified in the third step and in parallel with the one direction.

When the display failure is corrected according to the present invention, the display failure linearly generated in the image pickup sensor can be precisely corrected.

BRIEF DESCRIPTION OF THE DRAWINGS

These and other objects as well as advantages of the invention will become clear by the following description of preferred embodiments and explicit in the appended claims of the invention. Many other benefits of the invention, which are not cited in this specification, will come to the attention of those skilled in the art upon implementing the present invention.

FIG. 5 shows an imaging example using the image pickup sensor according to the present invention.

FIG. 6 is a timing chart according to the present invention.

DETAILED DESCRIPTION OF THE INVENTION

A preferred embodiment of the present invention is hereinafter described. It is needless to say that the embodiment described below is just an example, which is allowed to subject to all such modifications as fall within the true spirit and scope of the present invention. For example, the following description is based on a display failure (display flaw) generated along the vertical direction, however, the present invention can be applied to a display failure generated along the horizontal direction in the same manner depending on a drive direction of an image pickup device.

Figure 1:
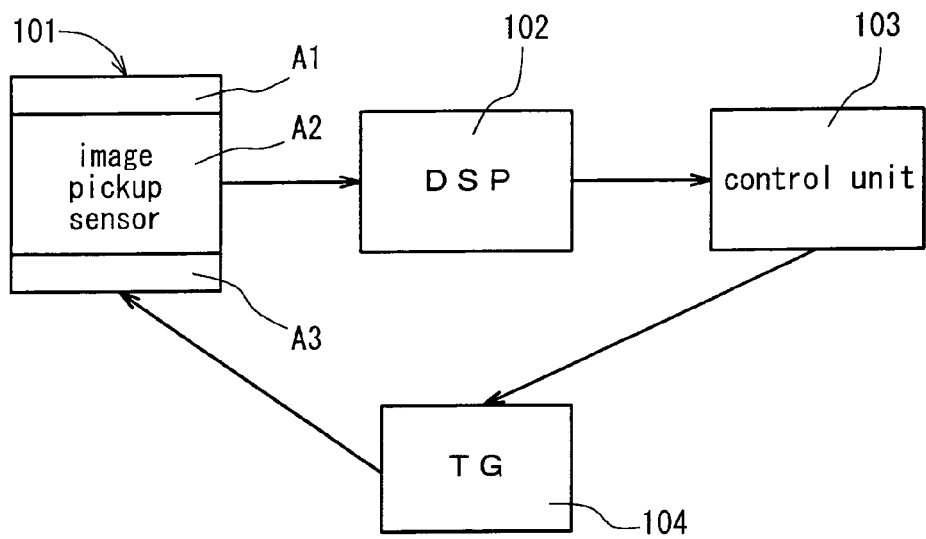
FIG. 1 is a block diagram of an entire constitution of a camera system according to the present invention.

FIG. 1 is a block diagram of an entire constitution of a digital camera system according to the present invention. Referring to reference numerals shown in FIG. 1, an image pickup sensor 101 picks up an image of a photographing object and thereby generates an image signal, and outputs the image signal to a DSP (Digital Signal Processor) 102. The DSP 102 processes the image signal so as to make the image signal displayable by a monitor device and outputs it outside (monitor device, recording device or the like not shown). In the present embodiment, the DSP 102 constitutes an example of the image processing device. The DSP 102 outputs control information to a control unit 103 comprised of a microcomputer and the like. The control unit 103 controls a timing generator 104 in accordance with the control information outputted from the DSP 102. The timing generator 104 generates a timing control signal for controlling a timing by which the image pickup sensor 101 is driven and supplies the timing control signal to the image pickup sensor 101. The image pickup sensor 101 executes an imaging process based on the supplied timing control signal.

Figure 2:
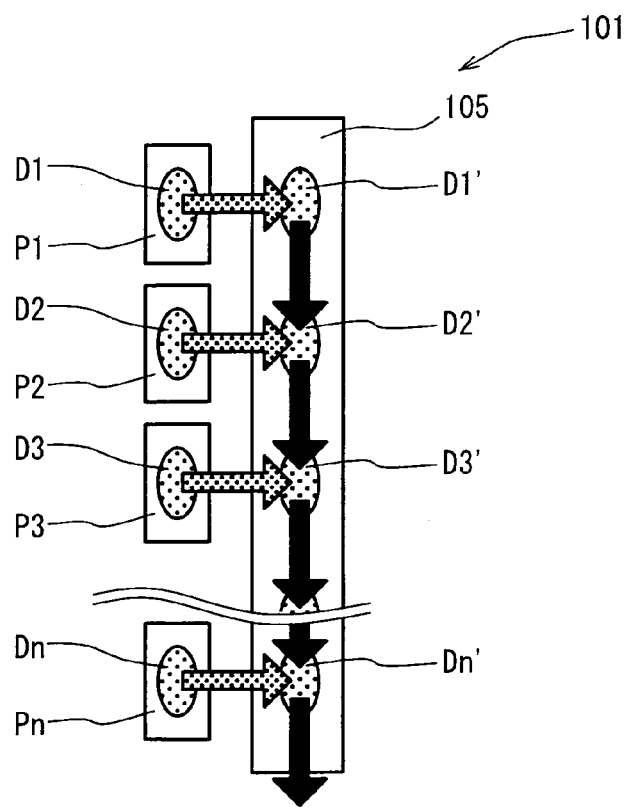
FIG. 2 shows transfer of charges of an image pickup sensor according to the present invention.

FIG. 2 is a view related to a charge transfer of the image pickup sensor 101. The image pickup sensor 101 comprises a plurality of image sensor elements P1-Pm (m is an optional natural number) two-dimensionally disposed. The image sensor elements P1-Pm are formed from photo diode or the like, and can store charges D1-Dm at the time of the image pickup. The image sensor elements P1-Pm are respectively provided with a transfer section 105 in each line where each of the image sensor elements is disposed along one direction (for example, vertical direction) on a surface where the elements of the image pickup sensor 101 are disposed. The transfer section 105 is hereinafter referred to as a vertical transfer section 105 provided that it is vertically disposed. The image sensor elements P1-Pn (n is an optional natural number and n<m) at the respective element-disposed lines transfer the charges to the vertical transfer sections 105 when the storage of the charges is completed at each image pickup timing. FIG. 2 shows an example of the constitution of the image sensor elements P1-Pn and the transfer section 105 in an element-disposing line. In the actual image pickup sensor 101, a large number of constitutions shown in the drawing are disposed in parallel so as to constitute the image pickup sensor 101 comprised of the m number of image sensor elements P1-Pm.

In FIG. 2, the charge D1 of the image sensor element P1 corresponds to a charge D1' of the vertical transfer section 105, the charge D2 of the image sensor element P2 corresponds to a charge D2' of the vertical transfer section 105, the charge D3 of the image sensor element P3 corresponds to a charge D3' of the vertical transfer section 105, and the charge Dn of the image sensor element Pn corresponds to a charge Dn' of the vertical transfer section 105. The vertical transfer section 105 transfers the charges in the order of Dn', -D3', D2' and D1' in the vertical direction.

Assuming that some kind of failure is generated in the vertical transfer section 105, by which a level of a dark current is increased, an influence from the failure is serially transferred to all of the output charges of the image sensor elements P1-Pn connected to the vertical transfer section 105 undergoing the failure. To be specific, signal levels of the charges of the respective image sensor elements P1-Pn outputted from the vertical transfer section 105 are increased. As a result, a white color display failure of a linear shape is generated along the one direction (vertical direction in the present embodiment) on a display screen.

A Method of Detecting a Position Where the Display Failure is Generated

Thus, the defect generated in the vertical transfer section 105 results in the defective white color display in the vertical direction on the display screen. First, a method of identifying the position in the vertical transfer section 105 where the defect is generated is described.

When the imaging operation is commenced or terminated by the image pickup sensor 101, the charges D1'-Dm' stored in the image sensor elements P1-Pm are all released. More specifically, the charges D1'-Dm' stored in the image sensor elements P1-Pm and in the respective transfer sections 105 are all erased. The Dm' is a charge outputted from the image sensor element Pm.

The foregoing process is effective if the charge resulting in a noise is more possibly stored in the vertical transfer section 105 when the defective vertical transfer section is detected. More specifically, in the case of detecting a position of the defective vertical transfer section after the image pickup is carried out in a long time, a relatively large number of charges resulting in the noise may be unfavorably stored in the image sensor elements P1-Pm and the respective vertical transfer sections 105 when the defective vertical transfer section is detected. The foregoing problem can be solved when the charges D1'-Dm' stored in the image sensor elements P1-Pm are all erased.

After the charges D1'-Dm' of the image sensor elements P1-Pm are all erased, the transfer of the charges from the image sensor elements P1-Pm to the respective transfer sections 105 is halted for a relatively long period of time. Thereby, the dark currents generated in the respective transfer sections 105 are stored. The length of time for halting the transfer is set to such a length of time that the storage volumes of the dark currents in the respective vertical transfer sections 105 can reach a fully detectable level. To be specific, approximately $1/30$ seconds are appropriate.

After that, the transfer process is executed to the respective transfer sections 105 without reading the charges from the image sensor elements P1-Pm so that the image signal is outputted from the image pickup sensor 101.

Figure 3:
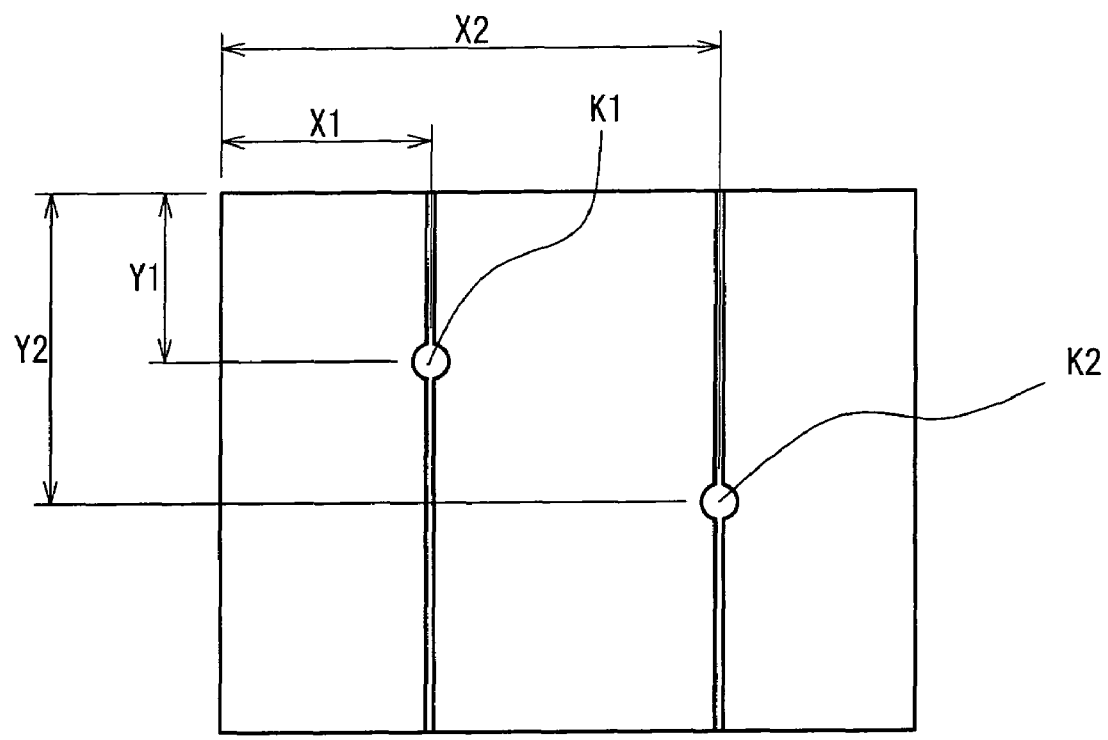
FIG. 3 shows an imaging example using the image pickup sensor according to the present invention.

FIG. 3 is a display example of a captured image which is created based on the output of the image pickup sensor 101 which carried out the foregoing process. As shown in FIG. 3, the signal levels at pixel positions corresponding to positions in the vertical transfer section 105 where the defects are generated (K1 and K2) are higher though the charges are not read from the image sensor elements P1-Pm. From the aspect of such an output property of the vertical transfer section 105, it can judged that it is not the image pickup sensors P1-Pm but the vertical transfer section 105 which is undergoing some kind of failure at a position in the image pickup sensor 101 corresponding to a pixel position at which a white level on the display is increased.

The failure of the vertical transfer section 105 is embodied in the foregoing manner to be thereby detected. More specifically, in the before-mentioned state, the signals outputted from the image pickup sensors P1-Pm are inputted to the DSP 102, and a differential between the signal corresponding to each target pixel and the signal corresponding to a pixel disposed in a periphery of the target pixel is calculated in the DSP 102. A threshold value of the differential is previously memorized in the DSP 102. The threshold value denotes a boundary value of the differential, wherein it can be judged that the vertical transfer section 105 for supplying the signal of the target pixel is undergoing some kind of failure when the differential exceeds the threshold value.

The DSP 102 compares the calculated differential to the threshold value and thereby judges that the vertical transfer section 105 in charge of transmitting the relevant output is undergoing some kind of failure when the calculated differential is larger than the threshold value. When the judgment result is "defective", a position of the target pixel is memorized as a position at which the defect is generated. In FIG. 3, because a pixel of the defect-generating generating position K1 is remarkably brighter than any peripheral pixel, the position K1 is judged as the defect-generating position. Accordingly, X1, Y1, which is an address of the defect-generating position K1 is memorized in a register or the like not shown. X2, Y2, which is an address of the defect-generating position K2 is also memorized in the register or the like not shown in the same manner.

A Method of Detecting the Display Failure When the Defective Signal Level at the Defect-Generating Position on a Line is Constant Next, a method of correcting the display failure at the identified defect-generating position is described. The image pick up sensor 101 is generally provided with an effective region A2, image sensor element regions referred to as optical black regions A1 and A3 for judging an optical black level as shown in FIG. 1. The optical black regions A1 and A3 are generally provided at both ends of the effective region A2 in the vertical direction. The image pick up sensor 101 is adapted in such manner that the optical black regions A1 and A3 are prevented from exposure to any light. The image pickup sensor 101 judges the optical black level using signal levels of the optical black regions A1 and A3 as an offset level.

According to the present invention, the display failure caused by the fault of the vertical transfer section 105 is corrected by means of the optical black regions A1 and A3 in a monitor drive mode. More specifically, it is assumed that the signal levels of the optical black regions A1 and A3 correspond to a signal level of the vertical transfer section 105 (dark current level) increased by the fault of the vertical transfer section 105 because the optical black regions A1 and A3 are not exposed to any light. The present invention utilizes the foregoing fact to thereby implement a signal process as follows.

The signal levels in the optical black regions A1 and A3 of the vertical transfer section 105 are subtracted from the image signal transferred from the vertical transfer section 105 judged to be undergoing the failure so that an output level of the vertical transfer section 105 can be obtained.

Figure 4:
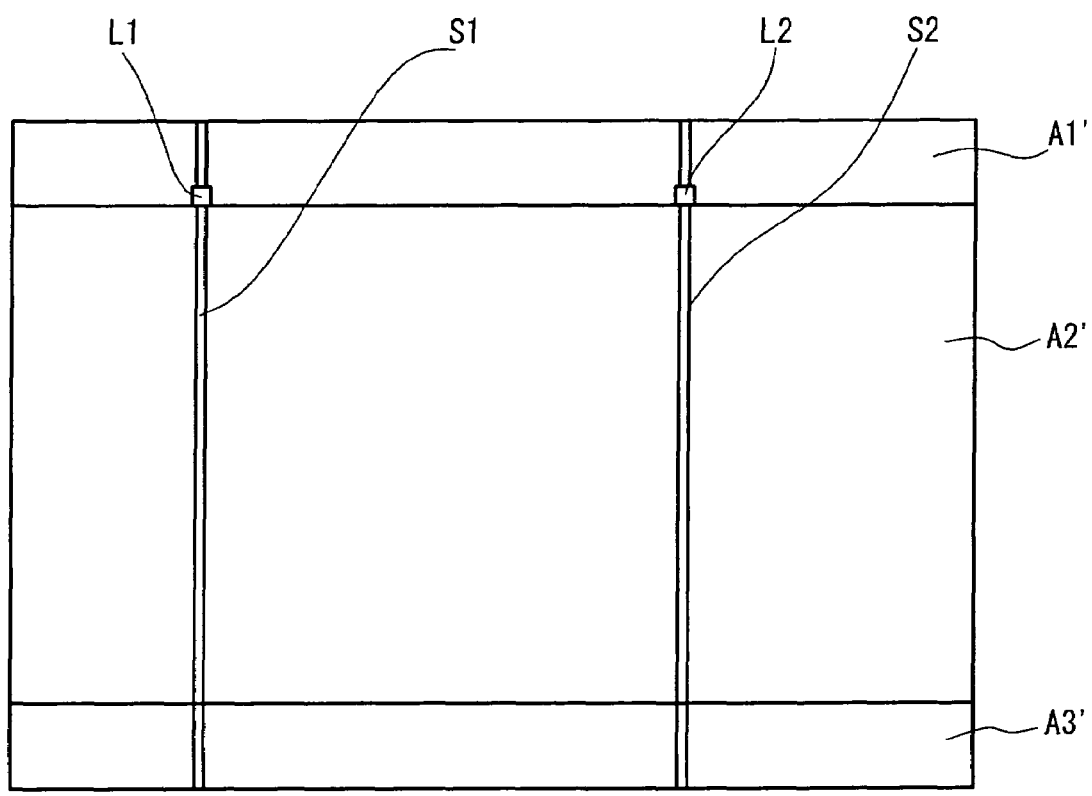
FIG. 4 is an illustration of a method of correcting a vertical flaw according to the present invention.

Hereinafter, a method of the foregoing correction is described in further detail referring to FIG. 4. FIG. 4 is an example of the display screen on which an image created by the camera system according to the present invention is displayed. In FIG. 4, optical black pixel regions A1' and A3' are provided at both ends of an effective pixel region A2'.

The optical black pixel region A1', which is seen on an upper side of the display screen, is a pixel region disposed on an upstream side in a transfer direction of the vertical transfer section 105 (vertical address) relative to the effective pixel region A2', in other words, transferred temporally prior to the effective pixel region A2'. The optical black pixel region A3', which is seen on a lower side of the display screen, is a pixel region disposed on a downstream side in the transfer direction of the vertical transfer section 105 (vertical address) relative to the effective pixel region A2', in other words, transferred temporally after the effective pixel region A2'.

The optical black pixel region A1' is a pixel region (screen region) created based on the signal from the optical black region A1 of the image pickup sensor 101, the effective pixel region A2' is a pixel region (screen region) created based on the signal from the effective region A2 of the image pickup sensor 101, and the optical black pixel region A3' is a pixel region (screen region) created based on the image signal outputted from the optical black region A3 of the image pickup sensor 101.

Groups of pixels positioned at the same horizontal addresses (X address) as the defect-generating positions K1 and K2 shown in FIG. 3 are referred to as groups of flaw pixels S1 and S2. The flaw pixel groups S1 and S2 are respectively generated from the image signal outputted from the same defective vertical transfer section. Of the flaw pixel groups S1 and S2, pixels positioned in the optical black pixel region A1' are respectively referred to as L1 and L2.

The monitor drive mode is such a mode that the image of the photographic object is continuously outputted to a monitor device and respective frames are driven in a same exposure time at that time. Accordingly, it is assumed that a degree of the display failure (flaw level) resulting from the vertical transfer section 105 in each of the frames is at an equal level in the monitor drive mode. Further, the dark current of the vertical transfer section 105 cannot be reset among the frames in the motor drive mode. Because of that, the defective charges are retained in the respective frames in a long period of time in the vertical transfer section, as a result of which the display failure (linear white flaw) resulting from the faulty vertical transfer section is at the same signal level in the vertical direction.

Based on the foregoing constitution, the pixels L1 and L2 positioned at the same horizontal addresses (X address) as the defect-generating positions K1 and K2 of the vertical transfer section 105 are identified in the optical black pixel region All disposed on the upstream side of the vertical address direction relative to the defect-generating positions K1 and K2 so that signal levels of the pixels L1 and L2 are detected. The detected signal levels of the pixels L1 and L2 are regarded as display failure levels of the flaw pixel groups S1 and S2 (dark current level).

Next, the signal level of the pixel L1 is subtracted from the signal level of the flaw pixel group S1 so that an output level in the flaw pixel group S1 is corrected (display failure is corrected). In the same manner, the signal level of the pixel L2 is subtracted from the signal level of the flaw pixel group S2 so that an output level in the pixel group S2 is corrected (display failure is corrected). In the foregoing manner, an output level in the monitor drive mode is corrected (display failure is corrected).

The pixels L1 and L2 positioned on the upper side in the vertical address direction relative to the defect-generating positions K1 and K2 are on the upstream side in the transfer direction of the vertical transfer section 105 relative to the defect-generating positions K1 and K2. The signal levels of the pixels L1 and L2 are measured temporally prior to the measurement of the signal levels of the defect-generating positions K1 and K2. Therefore, the display failure level can be identified temporally prior to the creation of the pixels without any particular problem.

In the presence of a plurality of optical black pixel regions A1', an average of the plurality of pixels may be calculated and used as the display failure level. The average calculation leads to the reduction of a fine variability among the pixels and more appropriate correction of the display failure. The addresses of the fault generating positions K1 and K2 may be identified and the display failure level may be calculated by the control unit 103 instead of the DSP 102.

A Method of Correcting the Display Failure in the Case in Which the Display Failure Levels are Different on Upper and Lower Sides of a Position Where the Display Failure is Generated)

In the case of photographing a still image, for example, the dark current of the vertical transfer section 105 is once cleared. In such a case, there are different display failure levels on the upper and lower sides of the fault generating position (the vertical addresses are on the upper and lower sides of the fault generating position) in any frame after the dark current is eliminated. More specifically, in the frame immediately after the dark current is eliminated, the display failure level is lowered at the pixel position on the upstream side in the vertical address direction relative to the fault generating position, while the display failure level is higher on the downstream side than on the upstream side. FIG. 5 shows an image picked up in the foregoing case. In the flaw pixel groups S1 and S2, upper-side flaw pixel groups S3 and S5 positioned on the upper side (upstream side) in the vertical address direction relative to the defect-generating positions K1 and K2 and lower-side flaw pixel groups S4 and S6 positioned on the lower side (downstream side) in the vertical address direction relative to the defect-generating positions K1 and K2 respectively have the different display failure levels (flaw level).

Next, correction methods in the case in which the display failure levels are different on the upper and lower sides of the display failure generating position are described.

First Correction Method

A dummy frame is additionally provided temporally prior to the frame obtained in the imaging operation, and a signal level of the dummy frame is used for the correction. Below is given a detailed description.

FIG. 6 is a timing chart of a vertical synchronous signal (VD). As shown in FIG. 6, an image signal of a dummy frame f1 is outputted from the image pickup sensor 101 without reading the charges from the image sensor elements P1-Pm temporally prior to a reading operation with respect to a real frame f2. The dummy frame f1 is set temporally immediately before the real frame f2.

In the foregoing state, display failure levels R3 and R5 of the upper-side flaw pixel groups S3 and S5 of the dummy frame f1 and display failure levels R4 and R6 of the lower-side flaw pixel groups S4 and S6 of the dummy frame f1 are respectively measured and memorized in the register or the like. The measurement step is more specifically described below.

Figure 7:
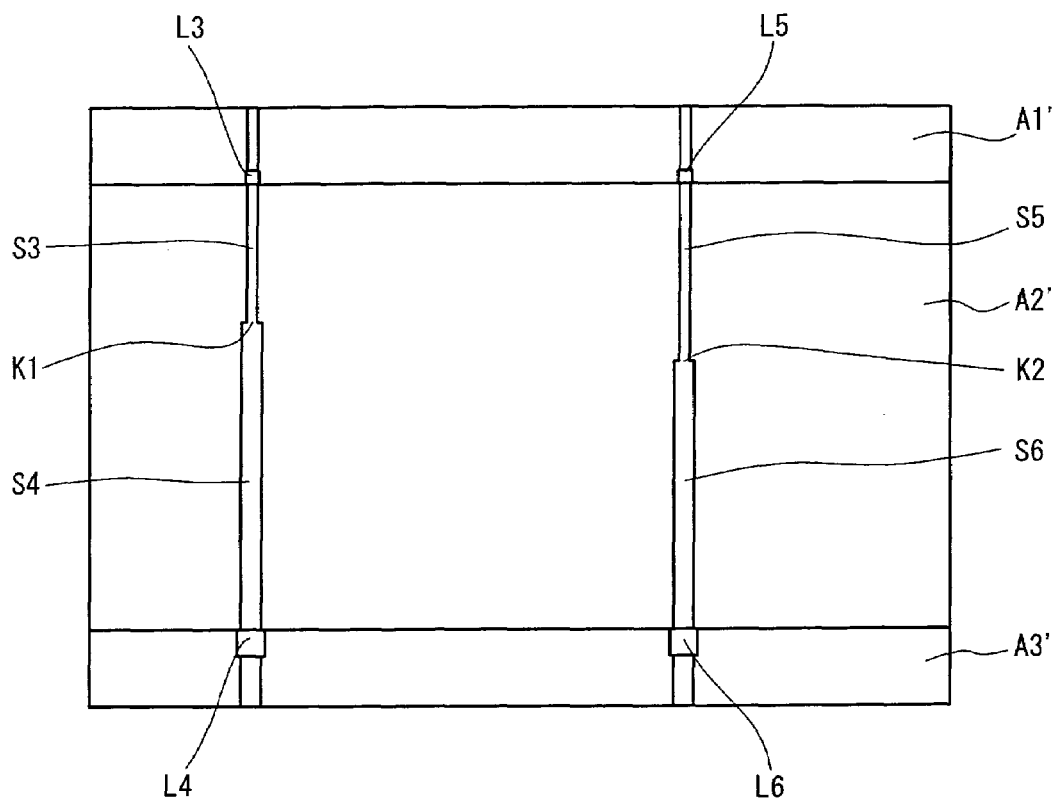
FIG. 7 is an illustration of a method of correcting a vertical flaw according to the present invention.

As shown in FIG. 7, a pixel L3 positioned at the same horizontal address (X address) as the fault generating position K1 in the optical black pixel region A1' disposed on the upper side of the vertical address relative to the defect-generating position K1 is identified in the measurement of the display failure level R3 of the upper-side flaw pixel group S3, and a signal level of the identified pixel L3 is detected. The detected signal level of the pixel L3 is memorized as the display failure level (dark current level) R3 of the flaw pixel group S3.

A pixel L5 positioned at the same horizontal address (X address) as the defect-generating position K2 in the optical black pixel region A1' disposed on the upper side of the vertical address relative to the defect-generating position K2 is identified in the measurement of the display failure level R5 of the upper-side flaw pixel group S5, and a signal level of the identified pixel L5 is detected. The detected signal level of the pixel L5 is memorized as the display failure level (dark current level) R5 of the flaw pixel group S5.

A pixel L4 positioned at the same horizontal address (X address) as the defect-generating position K1 in the optical black pixel region A3' disposed on the lower side of the vertical address relative to the defect-generating position K1 is identified in the measurement of the display failure level R4 of the lower-side flaw pixel group S4, and a signal level of the identified pixel L4 is detected. The detected signal level of the pixel L4 is memorized as the display failure level (dark current level) R4 of the flaw pixel group S4.

A pixel L6 positioned at the same horizontal address (X address) as the defect-generating position K2 in the optical black pixel region A3' disposed on the lower side of the vertical address relative to the defect-generating position K2 is identified in the measurement of the display failure level R6 of the lower-side flaw pixel group S6, and a signal level of the identified pixel L6 is detected. The detected signal level of the pixel L6 is memorized as the display failure level (dark current level) R6 of the flaw pixel group S6.

The pixels L4 and L6 disposed on the lower side of the vertical address relative to the defect-generating positions K1 and K2 are on the downstream side in the transfer direction of the vertical transfer section 105 relative to the defect-generating positions K1 and K2, and the signal levels of the pixels L4 and L6 are measured temporally after the levels measurements with respect to the defect-generating positions K1 and K2. However, the measurement is implemented, not to the real frame f1, but to the dummy frame f1 temporally prior to the real frame f1. In the dummy frame f1, the display failure levels R3-R6 are only detected. Because the dummy frame f1 is not subjected to the display failure correction in real time, no particular problem is generated.

In the pixel group S3 disposed on the upper side of the vertical address of the defect-generating position K1, the display failure level R3 is subtracted from the signal levels of the respective pixels so that the display failure correction is carried out. In the pixel group S4 disposed on the lower side of the vertical address of the defect-generating position K1, the display failure level R4 is subtracted from the signal levels of the respective pixels so that the display failure correction is carried out. In the pixel group S5 disposed on the upper side of the vertical address of the defect-generating position K2, the display failure level R5 is subtracted from the signal levels of the respective pixels so that the display failure correction is carried out. In the pixel group S6 disposed on the lower side of the vertical address of the defect-generating position K2, the display failure level R6 is subtracted from the signal levels of the respective pixels so that the display failure correction is carried out.

A signal level of a pixel or an average value of a plurality of pixels may be set as the display failure levels R3-R6 calculated in the dummy frame f1. When the average value is used, the correction can be realized in a more appropriate manner in which a fine variability among the pixels can be reduced.

Second Correction Method

In a second correction method, data of the real frame f2, instead of using the dummy frame f1, is used to implement the correction as follows.

In the real frame f2, an average value of signal levels of two pixels adjacent to the respective pixels undergoing the display failure in the horizontal address direction (X address) is calculated, and the calculated value is used as the signal level of the image sensor element in which the flaw is generated so that the display failure correction is carried out. More specifically, the signal level of the pixel on a line including the defect-generating position and in parallel with the vertical direction is corrected by means of the signal levels of the pixels adjacent to the pixel undergoing the display failure on lines in parallel with and adjacent to the line in parallel with the vertical direction. The display failure correction may be applied to all of the image sensor elements of the flaw pixel groups S1 and S2.

Modification Example of Flaw Correction Method

In the foregoing embodiment, the display failure level is obtained by means of only the signals of the optical black regions A1 and A3 (optical black pixel regions A1' and A3') in a frame. However, when a significantly large random noise is generated in a frame, for example, the correction may not obtain a high precision when the flaw is corrected by means of only the signals of the optical black regions A1 and A3 (optical black pixel regions A1' and A3') in a frame. Further, the display failure may not be appropriately corrected due to a smear generated in the optical black regions A1 and A3 (optical black pixel regions A1' and A3') when the image pickup sensor 101 is exposed to an intense light source.

Figure 8:
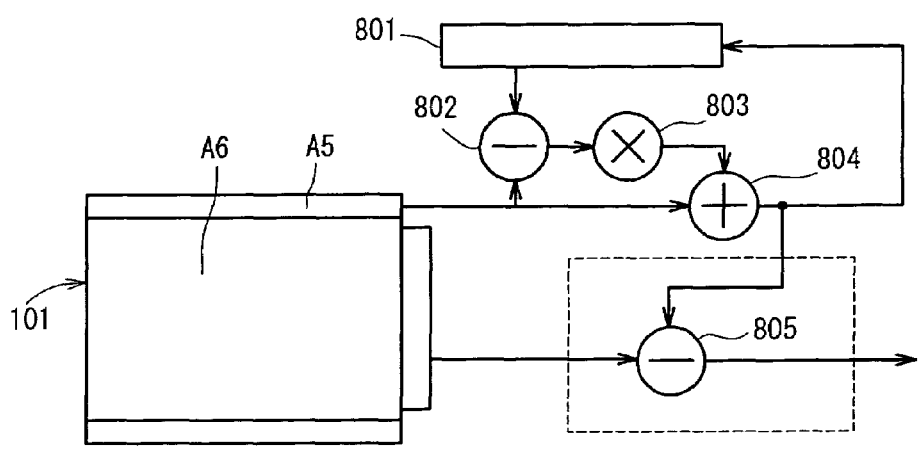
FIG. 8 shows a cyclic addition filter according to the present invention.

In the foregoing cases, a weight average of the signals of the optical black regions (optical black pixel regions) is calculated in a plurality of frames so as to constitute the display failure level. In doing so, as shown in FIG. 8, a cyclic addition filter is used to calculate the weighted average of the signals of the optical black regions (optical black pixel region). The cyclic addition filter described below is, for example, incorporated into the DSP 102.

Hereinafter, a correction method using the cyclic addition filter is specifically described. Referring to reference symbols n FIG. 8, A6 denotes an effective element region of the image pickup sensor 101, A5 denotes an optical black region of the image pickup sensor 101 to which the detection of the display failure level is implemented, 804 denotes an adder for implementing an addition process to an image signal outputted from the optical black region A5, 801 denotes a buffer in which an output of the adder 804 is stored, 802 denotes a subtracter for subtracting the image signal of the optical black region A5 from an output of the buffer 801, 803 denotes a multiplier for implementing a multiplication process to an output of the subtracter 803, and 805 denotes a subtracter for subtracting the output of the adder 804 from an image signal outputted from the effective element region A6. The adder 804 adds an output of the multiplier 803 to the image signal of the optical black region A5.

When a signal level of the image signal outputted from the optical black region A5 is defined as X and a signal level stored in the buffer 801 is defined as Y, the output of the subtracter 802 results in Y−X. When a cyclic coefficient of the multiplier 803 is defined as K, the output of the multiplier 803 results in K×(Y−X). The adder 804 sums a signal level X of the optical black region A5 and the output of the multiplier 803 K×(Y−X). Then, the output of the adder 804 results in K×Y+(1−K)×X. Thus, a weighted average value of the signal level X and the storage value Y of the buffer 801 is outputted from the adder 804.

The DSP 102 implements the correction to the signal of the effective element region A6 using the output of the adder 804 as the display failure level. More specifically, the subtracter 805 subtracts the display failure level calculated in the adder 804 from the image signal in the flaw pixel group at the same horizontal address as the fault generating position. The output of the adder 804 is serially stored in the buffer 801. Therefore, a weighted average value of the display failure levels up to a previous frame and a value of the display failure level in a current frame are calculated into an average weighted value.

The cyclic coefficient K can be appropriately set by the control unit 103 and subject to change in response to the expected random noise or smear. The larger the cyclic coefficient K is, the more weighted the data of the previous frame, instead of the data of the current frame, is. The smaller the cyclic coefficient K is, the more weighted the data of the current frame, instead of the data of the previous frame, is.

In the described manner, the display failure level is calculated so that the display failure correction responding to the variability among the frames can be realized. Further, it is needless to say that the described method of using the dummy frame f1 and/or the like can be combined, for example, in the case of different display failures levels on the upper and lower sides in the vertical address direction of the fault generating position.

As described, the generation of the large random noise or smear causes an adverse effect in not only the case of using the signal of the optical black region for the calculation of the display failure level but also in the case of using the signal of the optical black region for the calculation of the optical black level in the conventional manner. Therefore, the cyclic addition filter shown in FIG. 8 may be used for the conventional calculation of the optical black level. In the foregoing manner, a high-quality image undergoing no variability among the frames can be created, particularly, in the monitor drive mode.

The vertical flaw correction according to the present invention is effective for improving a quality of an image picked up by a camera and can be applied to a digital camera (digital still camera, digital video camera, camera-incorporated mobile phone and the like).

While there has been described what is at present considered to be preferred embodiments of the present invention, it will be understood that various modifications may be made therein, and it is intended to cover in the appended claims all such modifications as fall within the true spirit and scope of the present invention.

What is claimed is:

1. An image processing method for correcting a defective signal level of an image pickup sensor comprising image sensor elements two-dimensionally disposed and a transfer section for transferring charges stored in the image sensor elements along one direction on a surface where the image sensor elements are disposed, comprising:
a first step of halting the transfer of the charges by the transfer section for a predetermined length of time;
a second step of transferring the charges from the transfer section without reading the charges from the image sensor elements after the transfer of the charges is halted for the predetermined length of time;
a third step of identifying a position where a defect is generated in the image pickup sensor based on signal levels of the charges transferred in the second step; and
a fourth step of correcting the defective signal level of the image pickup sensor generated on a line including the defect-generating position identified in the third step and in parallel with the one direction,
wherein the charges in the image sensor elements and the transfer section are erased temporally prior to the implementation of the first step,
the transfer of the charges by the transfer section is halted until a volume of a dark current stored in the transfer section can reach a detectable signal level as a result of the halt of the transfer of the charges in the first step, and
the defect-generating position is identified by comparing signal levels at respective positions on the image pickup sensor and a signal level in a periphery of the respective positions in the third step.

2. An image processing method as claimed in claim 1, wherein
a differential between the signal levels at the respective positions on the image pickup sensor and the signal level in the periphery of the respective positions is calculated, and the relevant position is determined as the defect-generating position when the calculated differential is larger than a previously set threshold value in the third step.

3. An image processing method as claimed in claim 1, wherein
the image pickup sensor comprises optical black regions on both ends thereof in the one direction, and
the defective signal level of the image pickup sensor is corrected based on comparison of signal levels at respective positions on a line including the defect-generating position and in parallel with the one direction and a signal level at a position opposing to the defect-generating position along the one direction in the optical black region disposed on an upstream side relative to the defect-generating position in a transfer direction of the transfer section in the fourth step.

4. An image processing method as claimed in claim 3, wherein
an average value in a plurality of positions is used as the signal level at the position opposing to the defect-generating position along the one direction in the optical black region in the fourth step.

5. An image processing method as claimed in claim 3, wherein
the signal level at the position opposing to the defect-generating position along the one direction in the optical black region is defined as the defective signal level, and
the defective signal level is subtracted from the signal levels at the respective positions on the line including the defect-generating position and in parallel with the one direction so that the defective signal level of the image pickup sensor is corrected in the fourth step.

6. An image processing method as claimed in claim 3, wherein
signal levels at respective positions calculated into weighted average values in a plurality of frames are used as the signal level at the position opposing to the defect-generating position along the one direction in the optical black region in the fourth step.

7. An image processing method as claimed in claim 1, wherein a dummy frame is provided temporally prior to a real frame to which an actual imaging process is implemented, a degree of the defective signal level generated on the line including the defect-generating position and in parallel with the one direction is identified in the dummy frame, and the defective signal level of the image pickup sensor generated on the line including the defect-generating position and in parallel with the one direction is corrected based on the identified degree of the defective signal level in the real frame in the fourth step.

8. An image processing method as claimed in claim 7, wherein a signal level at a position opposing to the defect-generating position along the one direction in an optical black region disposed on an upstream side in a transfer direction of the transfer section is used as signal defective levels at respective positions on the upstream side in the transfer direction of the transfer section relative to the defect-generating position, and a signal level at a position opposing to the defect-generating position along the one direction in an optical black region disposed on a downstream side in the transfer direction of the transfer section is used as signal defective levels at respective positions on the downstream side in the transfer direction of the transfer section relative to the defect-generating position in the fourth step.

9. An image processing method as claimed in claim 1, wherein the signal level generated on the line including the defect-generating position and in parallel with the one direction is corrected by means of signal levels on lines in parallel with and adjacent to the line in parallel with the one direction in the fourth step.

10. An image processing method as claimed in claim 9, wherein the signal level generated on the line including the defect-generating position and in parallel with the one direction is replaced by signal levels at positions on the parallel lines adjacent to respective positions on the line in parallel with the one direction in the fourth step.

11. A camera system comprising:

an image pickup sensor comprising image sensor elements two-dimensionally disposed and a transfer section for transferring charges stored in the image sensor elements along one direction on a surface where the image sensor elements are disposed; and an image processing device for correcting a defective signal level of the image pickup sensor, wherein the image processing device halts the transfer of the charges by the transfer section for a predetermined length of time, transfers the charges from the transfer section without reading the charges from the image sensor elements after the transfer of the charges is halted for the predetermined length of time, identifies a position where a defect is generated in the image pickup sensor based on signal levels of the transferred charges, and corrects the defective signal level of the image pickup sensor generated on a line including the identified defect-generating position and in parallel with the one direction, the image processing device erases the charges in the image sensor elements and the transfer section temporally prior to the halt of the transfer of the charges by the transfer section, the image processing device halts the transfer of the charges by the transfer section until a volume of a dark current stored in the transfer section can reach a detectable signal level as a result of the halt of the transfer of the charges, and the image processing device identifies the defect-generating position by comparing signal levels at respective positions on the image pickup sensor and a signal level in a periphery of the respective positions.

12. A camera system as claimed in claim 11, wherein the image processing device calculates a differential between signal levels at respective positions on the image pickup sensor and a signal level in a periphery of the respective positions and determines the relevant, position as the defect-generating position when the calculated differential is larger than a previously set threshold value.

13. A camera system as claimed in claim 11, wherein the image pickup sensor comprises optical black regions on both ends thereof in the one direction, and the image processing device corrects the defective signal level of the image pickup sensor based on comparison of signal levels at respective positions on a line including the defect-generating position and in parallel with the one direction and a signal level at a position opposing to the defect-generating position along the one direction in the optical black region disposed on an upstream side relative to the defect-generating position in a transfer direction of the transfer section.

14. A camera system as claimed in claim 13, wherein the image processing devices uses an average value in a plurality of positions as the signal level at the position opposing to the defect-generating position along the one direction in the optical black region.

15. A camera system as claimed in claim 13, wherein the image processing device defines the signal level at the position opposing to the defect-generating position along the one direction in the optical black region as the defective signal level, and the image processing device further subtracts the defective signal level from the signal levels at the respective positions on the line including the defect-generating position and in parallel with the one direction to thereby correct the defective signal level of the image pickup sensor.

16. A camera system as claimed in claim 13, wherein the image processing devices uses signal levels at respective positions calculated into weighted avenge values in a plurality of frames as the signal level at the position opposing to the defect-generating position along the one direction in the optical black region.

17. A camera system as claimed in claim 11, wherein the image processing device provides a dummy frame temporally prior to a real frame to which an actual imaging process is implemented, identifies a degree of the defective signal level generated on the line including the defect-generating position and in parallel with the one direction in the dummy frame, and corrects the defective signal level of the image pickup sensor generated on the line including the defect-generating position and in parallel with the one direction based on the identified degree of the defective signal level in the real frame.

18. A camera system as claimed in claim 17, wherein the image processing device uses a signal level at a position opposing to the defect-generating position along the one direction in an optical black region disposed on an upstream side in a transfer direction of the transfer section as signal defective levels at respective positions on the upstream side in the transfer direction of the transfer section relative to the defect-generating position, and the image processing device further uses a signal level at a position opposing to the defect-generating position along the one direction in an optical black region disposed on a downstream side in the transfer direction of the transfer section as signal defective levels at respective positions on the downstream side in the transfer direction of the transfer section relative to the defect-generating position.

19. A camera system as claimed in claim 11, wherein the image processing device corrects the signal level generated on the line including the defect-generating position and in parallel with the one direction by means of signal levels on lines in parallel with and adjacent to the line in parallel with the one direction.

20. A camera system as claimed in claim 19, wherein the image processing device replaces the signal level generated on the line including the defect-generating position and in parallel with the one direction by means of signal levels at positions on the parallel lines adjacent to respective positions on the line in parallel with the one direction.

21. An image processing method as claimed in claim 1, wherein a differential between the signal levels at the respective positions on the image pickup sensor and the signal level in the periphery of the respective positions is calculated, and the relevant position is determined as the defect-generating position when the calculated differential is larger than a previously set threshold value in the third step.

22. A camera system as claimed in claim 11, wherein the image processing device identifies the defect-generating position by comparing signal levels at respective positions on the image pickup sensor and a signal level in a periphery of the respective positions.

* * * * *